March 31, 1936.  H. H. CHESNY  2,035,460
MAGNESIUM PRODUCT AND PROCESS OF MANUFACTURE
Filed Nov. 11, 1932
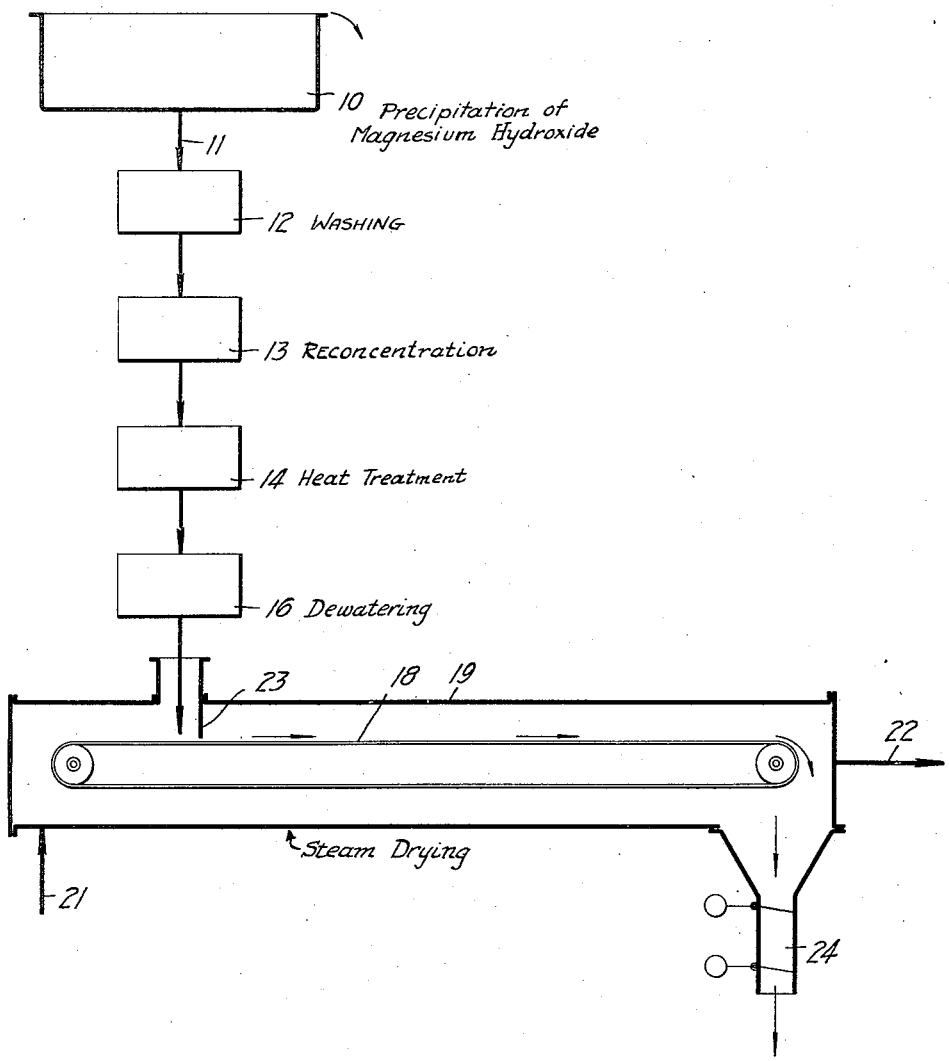
INVENTOR.
Heinz H. Chesny
BY
White, Prost, Flehr & Lothrop
ATTORNEYS.

Patented Mar. 31, 1936

2,035,460

UNITED STATES PATENT OFFICE 2,035,460

MAGNESIUM PRODUCT AND PROCESS OF MANUFACTURE

Heinz H. Chesny, San Mateo, Calif., assignor to Marine Chemicals Company, Ltd., San Francisco, Calif., a corporation of Delaware Application November 11, 1932, Serial No. 642,268

12 Claims. (Cl. 23—201)

This invention relates generally to chemical products containing the element magnesium, and to processes for the commercial manufacture of such products.

It is an object of the present invention to provide a new magnesium product, the distinctive characteristics of which render it valuable as a material for many industrial and pharmaceutical uses, and as a base ingredient for compounding additional products.

More specifically, it is an object of the invention to provide a magnesium product which is activated with respect to its chemical and physical properties.

A further object of the invention is to provide a novel process for the manufacture of my product.

Further objects of the invention will appear from the following description in which the preferred embodiment of the invention has been illustrated in conjunction with the accompanying drawing.

The single figure of the drawing diagrammatically illustrates one form of my process.

A suitable source of magnesia which I can utilize in my process is a brine, such as sea water, containing convertible magnesium salts. The first portion of my process in its preferred form consists in precipitating magnesium hydroxide from the brine or sea water, by reacting the same with lime. In this connection I can utilize the process disclosed in copending application Ser. No. 608,202 in order to secure a suitable magnesium hydroxide precipitate. In the drawing precipitation of magnesium hydroxide from brine is indicated as being carried out within the tank 10, the settled magnesium hydroxide concentrate being drawn off from this tank as indicated at 11. The magnesium hydroxide concentrate drawn off at 11 is then preferably treated to remove undesired impurities as indicated at 12. In this connection I prefer to employ the purifying apparatus and method disclosed in copending application Ser. No. 623,369.

Briefly, the purifying method as disclosed in said co-pending application Serial No. 623,369 is as follows:—An upwardly flowing body of fresh water is maintained in a suitable tank or container. The settled magnesium hydroxide slurry is introduced into the upper part of this body in the form of filamentary flocks, which progress downwardly to collect in the lower part of the container for removal. While progressing downwardly through the fresh water, soluble salts and like impurities are extracted into the fresh water, whereby the magnesium hydroxide is effectively purified. If necessary, this procedure can be repeated until the desired degree of purity is obtained.

The purified magnesium hydroxide is then reconcentrated as indicated at 13, and in the process as now practiced is subjected to a heat treatment as indicated at 14. This heat treatment can be carried out at a temperature as low as 70° centigrade, but best results are secured with a temperature of about 100° C. This heat treatment can be termed a "boiling" of the magnesium hydroxide. It may be explained that boiling at this point facilitates subsequent further concentration in a suitable commercial filter. Following the boiling at 14, the material is then dewatered to paste-like consistency, as indicated at 16. This dewatering can be accomplished by suitable well-known methods, as for example by filtering, and in practice the resulting paste may contain from 25 to 35% solids.

Following the production of a paste as explained above, this material is then subjected to a drying operation under controlled conditions. Thus from 16 the paste is shown being introduced upon a conveyor 18. A part or all of conveyor 18 is disposed within an elongated chamber 19, thus forming what can be termed a tunnel dryer. The drying medium maintained within chamber 19 is preferably superheated steam, introduction and removal of which is indicated at 21 and 22. Preferably the flow of steam is in the same direction as the movement of the paste being dried. While the temperature maintained within chamber 19 can be adjusted to secure best results, I have been successful in maintaining a temperature of about 165° C. at the intake end of chamber 19, and a temperature of from 110 to 120° C. at the discharge end.

To secure consistent results I prefer to deliver the paste to the belt 18, in the form of a cake or ribbon of predetermined thickness. Good results have been secured by a thickness of about ½ inch, although a latitude of from say ⅛ to 1 inch is permissible. A spreader 23 can be employed for spreading the material upon the conveyor in the form of a sheet of predetermined and uniform thickness. After passing the length of chamber 19, the dried material which is now in solid form, is delivered thru the conventional discharge means 24.

If the paste is observed during the drying operation, it will be found to undergo a remarkable change. At first the paste appears to be quite wet, it is sticky to the touch, and its color decidedly grey. Near the end of the drying operation the material changes to an extreme whitish color, it becomes dry to the touch, and readily powders. The factors affecting the drying should be so controlled that following conversion of the paste to such a white solid material, very little, if any, additional moisture is removed. Stated in terms of moisture or water content, an amount of water should be removed from the paste so that the resultant dry material contains from 20 to 25% moisture, the theoretical optimum moisture content being about 23%. It is when the material approaches this moisture content, that it changes to the extreme white color. The material delivered thru the discharge means 24 is in the form of solid cakes, which can be readily reduced to powdered form.

According to my analysis the product produced as explained above is a definite composition, which I term "magnesium hydroxy monohydrate", and which may have the formula $Mg(OH)_2 \cdot H_2O$. This compound has all of the desirable chemical properties of magnesium hydroxide, particularly with respect to the manner in which it reacts chemically with other materials. However in contrast to magnesium hydroxide, it possesses many additional desirable properties. One important property is that it has a particularly high adsorptive power, compared to prior magnesium products of which I am aware. This can be demonstrated by showing its effectiveness in removal of dye stuffs from solutions; by the removal of caramel from sugar solutions; the removal of coloring matter from petroleum hydrocarbons, and like applications depending upon high adsorptive power.

A further desirable characteristic of my composition is that it can be readily dispersed in water to form an additional commercial product, having all of the desirable chemical properties of ordinary milk of magnesia. In the manufacture of such a product, my solid dried material is ground to a powder and is then dispersed in water by a suitable agitator or colloidal mill, such as are known in the art.

A dispersion of my magnesium hydroxy monohydrate in water has inherent desirable characteristics distinguishing it from ordinary milk of magnesia. It is in the nature of a colloid with relatively high chemical activity, and is of relatively high viscosity. Likewise as distinguished from ordinary milk of magnesia, such a dispersion will not settle to any appreciable degree, when permitted to stand. In common with the magnesium hydroxy monohydrate base, the dispersion likewise has a relatively high adsorptive power. A further property in common with the base ingredient, is that the dispersion in water is substantially tasteless, particularly when relatively free of impurities, as is made possible by my preferred process.

I have found that my product has great utility, and has many uses both of a pharmaceutical and industrial nature. Among pharmaceutical uses in addition to the manufacture of milk of magnesia, I may mention the compounding of antiacid powders and tablets, cosmetics, tooth pastes and powders, face powders, oil emulsions, and hand lotions. Among industrial uses I may mention the treatment of petroleum hydrocarbons, the filtering and decolorizing of various materials, neutralizing various materials, and the manufacture of pigments. With respect to the treatment of liquids such as petroleum hydrocarbons, my product may serve the dual function of a chemical neutralizer and adsorbing agent. With respect to the manufacture of pigments, since my product is of extreme whiteness, delicate colors may be imparted to it by adsorbing dyes or other coloring matter from solutions.

I claim:

1. As a new article of manufacture, magnesium hydroxy monohydrate, which may be expressed by the formula $Mg(OH)_2 \cdot H_2O$.

2. As a new article of manufacture, magnesium hydroxy monohydrate, which may be expressed by the formula $Mg(OH)_2 \cdot H_2O$, dispersed in water.

3. In a method of manufacturing magnesium products, forming a precipitate of magnesium hydroxide in water, removing sufficient water to form a paste, and then contacting the paste with a gaseous drying medium to reduce its moisture content to a value of substantially 20 to 25%.

4. In a method of manufacturing magnesium products, forming a suspension of magnesium hydroxide in water, removing sufficient water to form a paste, and then contacting the paste with superheated steam to remove sufficient water to form a solid material, which may be expressed by the formula $Mg(OH)_2 \cdot H_2O$.

5. In a method of manufacturing magnesium products, heating a suspension of magnesium hydroxide in water to substantially boiling temperature, removing water from the material to form a paste of the boiled material, forming the paste into a cake or ribbon of predetermined thickness, and then contacting the cake or ribbon with a gaseous drying medium to form a material which may be expressed by the formula $Mg(OH)_2 \cdot H_2O$.

6. In a method of manufacturing magnesium products, forming a suspension of magnesium hydroxide in water, removing sufficient water to form a paste, forming the paste into a cake or ribbon of predetermined thickness, and then contacting the cake or ribbon with a gaseous drying medium to form an ostensibly dry material which may be expressed by the formula $$Mg(OH)_2 \cdot H_2O.$$

7. In a method of manufacturing magnesium products, the steps of effecting precipitation of magnesium hydroxide from aqueous brine containing convertible magnesium salts, removing the magnesium hydroxide thereby precipitated from the main body of the brine and as a suspension in water, subjecting the suspension to washing for the removal of impurities, heating the suspension to an elevated temperature as exemplified by 100° C., removing water from the suspension after heat treatment thereof to form a mass of paste-like consistency, and then contacting the paste-like mass with super-heated steam to reduce its moisture content to a value of substantially 20 to 25%.

8. In a method of manufacturing magnesium products, forming a magnesium hydroxide precipitate in water, and then removing sufficient water to form an ostensibly dry solid material characterized by the fact that it conforms substantially to the formula $Mg(OH)_2 \cdot H_2O$, at least the final stage of said drying being effected to a substantial degree by contact with a drying gas.

9. In a method of manufacturing magnesium products, forming a magnesium hydroxide precipitate in water, and then removing sufficient water to form an ostensibly dry solid material containing substantially from 20% to 25% water, at least the final stage of said water removal being effected to a substantial degree by contact with a drying gas.

10. In a method of manufacturing magnesium products, the steps of effecting precipitation of magnesium hydroxide from an aqueous brine containing convertible magnesium salts, segregating the precipitated material as a magnesium hydroxide-water mixture, and then removing water from the mixture to an extent sufficient to form a magnesium hydroxy monohydrate, which may be expressed by the formula $Mg(OH)_2.H_2O$, at least the final stage of water removal being effected to a substantial degree by contacting the material with a heated gaseous medium.

11. In a method of manufacturing magnesium products, the steps of effecting precipitation of magnesium hydroxide from aqueous brine containing convertible magnesium salts, removing the magnesium hydroxide thereby precipitated from the main body of the brine and as a suspension in water, subjecting the suspension to washing for the removal of impurities, heating the suspension to an elevated temperature as exemplified by 100° C., removing water from the suspension after heat treatment thereof to form a mass of paste-like consistency, and then contacting the paste-like mass with superheated steam to reduce its moisture content to form an ostensibly dry material.

12. In a method for the manufacture of milk of magnesia, dispersing in water a powdered magnesium product conforming substantially to the formula $Mg(OH)_2.H_2O$.

HEINZ H. CHESNY.